(12) United States Patent
Henderson (10) Patent No.: US 10,040,579 B1
(45) Date of Patent: Aug. 7, 2018

(54) SHIPPING FRAME FOR JET AIRCRAFT ENGINE TRANSPORTATION

(71) Applicant: Jeffrey L. Henderson, Surprise, AZ (US)

(72) Inventor: Jeffrey L. Henderson, Surprise, AZ (US)

( * ) Notice: Subject to any disclaimer, the term of this patent is extended or adjusted under 35 U.S.C. 154(b) by 0 days.

(21) Appl. No.: 15/811,949

(22) Filed: Nov. 14, 2017

Related U.S. Application Data

(60) Provisional application No. 62/577,820, filed on Oct. 27, 2017.

(51) Int. Cl.
*B64F 5/50* (2017.01)
*F01D 25/28* (2006.01)
*B65D 85/68* (2006.01)

(52) U.S. Cl.
CPC ............. *B64F 5/50* (2017.01); *B65D 85/68* (2013.01); *F01D 25/285* (2013.01); *F05D 2260/02* (2013.01)

(58) Field of Classification Search
CPC ...... B64F 5/50; F01D 25/285; F05D 2260/02; B65D 85/68
USPC ......... 414/589, 590; 29/281.1, 281.4, 281.6; 248/554, 555
See application file for complete search history.

(56) References Cited

U.S. PATENT DOCUMENTS

| | | | | |
|---|---|---|---|---|
| 2,825,477 A | * | 3/1958 | Ross | B25H 1/0007 269/12 |
| 3,268,093 A | * | 8/1966 | Keiter | B23Q 3/157 414/560 |
| 4,412,774 A | * | 11/1983 | Legrand | B64F 5/50 180/298 |
| 4,660,796 A | * | 4/1987 | Garrec | B65D 85/68 108/55.1 |
| 4,699,337 A | | 10/1987 | Lewis | |
| 5,320,475 A | | 6/1994 | Pinder | |
| 5,383,652 A | | 1/1995 | Van Den Berg | |
| 5,722,512 A | | 3/1998 | Lilja et al. | |
| 5,816,367 A | * | 10/1998 | Lilja | F01D 25/285 187/244 |
| 6,000,903 A | | 12/1999 | Hatch et al. | |
| 6,170,141 B1 | | 1/2001 | Rossway et al. | |
| 6,292,999 B1 | * | 9/2001 | Rossway | F01D 25/285 29/281.1 |
| 6,298,536 B1 | | 10/2001 | Rossway et al. | |
| 7,677,582 B2 | * | 3/2010 | Hedley | B60B 29/002 280/79.11 |

(Continued)

FOREIGN PATENT DOCUMENTS

EP          0066548       * 12/1982 ................ B64F 5/50

*Primary Examiner* — Michael Safavi
(74) *Attorney, Agent, or Firm* — Mark V. Loen

(57) ABSTRACT

The disclosed invention comprises screw jacks and supporting rollers mounted on a base frame. A rotating cradle with rolling plates are attached to the engine. The rolling plates are set on the support rollers and the rotating cradle is rotated by the manually operated screw jacks. The curvature and position of the rolling plates are carefully chosen to provide the needed rotation and horizontal/vertical movement of the engine, so as to fit within a small transport doorway.

Additionally, important features are included that secure the cradle from rotating when transporting, secure the cradle to the support rollers for safe movement, and provides a simplified horizontal and vertical movement.

10 Claims, 10 Drawing Sheets

(56) References Cited

U.S. PATENT DOCUMENTS

| | | | |
|---|---|---|---|
| 7,770,292 B2 | 8/2010 | Stretton | |
| 7,946,554 B2 * | 5/2011 | Sassatelli | F16C 13/04 248/346.2 |
| 8,057,140 B2 * | 11/2011 | Entwistle | B65D 19/44 410/47 |
| 8,833,776 B2 * | 9/2014 | Boulanger | B64F 5/0036 280/35 |
| 9,249,733 B2 * | 2/2016 | Hallam | F01D 25/285 |
| 2008/0135546 A1 | 6/2008 | Smith et al. | |
| 2009/0266275 A1 * | 10/2009 | Feeney | B65D 19/44 108/55.1 |
| 2009/0294625 A1 * | 12/2009 | Fernley | F01D 25/285 248/671 |
| 2011/0272553 A1 | 11/2011 | Alexander et al. | |
| 2012/0110816 A1 * | 5/2012 | Groves | B62B 3/10 29/428 |
| 2012/0228839 A1 | 9/2012 | Boulanger et al. | |
| 2015/0316197 A1 * | 11/2015 | Morey | B62B 3/02 280/30 |

* cited by examiner

SHIPPING FRAME FOR JET AIRCRAFT ENGINE TRANSPORTATION

CROSS REFERENCE TO RELATED APPLICATIONS

This application claims the benefit of U.S. provisional application No. 62/577,820 filed on Oct. 27, 2017. The entire provisional application is included by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to shipping frames for aircraft engines which provide for easy transport of a heavy jet engine securely, and without damage to delicate components. Shipping is done via trucking or by an aircraft utilizing the same transport frame. Additionally, this invention is also directed to engine handling that facilitates convenient engine installation and removal.

(2) Description of Related Art

Aircraft engines have needs for repair and inspected, and at a certain interval, they are required by FAA regulations to be inspected. An engine is arguably the most critical component of an aircraft, and the demands for reliability are the highest.

The aircraft engine must be transported from a factory to an airplane without damage, and designed to be efficiently and safely mounted on an airplane. Also, removal for maintenance is equally demanding. To this end, support frames designed to secure the engine for transport have been designed and are in use.

Currently, transportation and storage of a jet aircraft engine includes a base frame support which is easily transported. The transport designs include safe transport without damage, and to provide convenient presentation of important mounting/lift points to the maintenance crew for installation on an aircraft. Shock absorbers are frequently used to avoid transportation vibrations.

It is the usual case that when shipping an engine on an airplane, it must also be shipped by truck to the airplane first. Consequently, efficient transportation includes an 'air shipping' position and a 'truck shipping' position. The air shipping position is preferably designed to fit inside a Boeing 747 cargo door, so as to facilitate loading in a Boeing 747.

It is important for transportation and installation to be done on a single support frame, for efficiency and to avoid un-necessary engine lifts and transfer among multiple support frames. Engine installation on an aircraft is usually done utilizing basic manual lifting tools, including a bootstrap kit, and various manually driven chain pulley block lifters. Various lifting bars and fixtures are used which are particular to a specific engine and aircraft combination. It is necessary, therefore, that the shipping frame is designed to get the engine in position, free of encumbering shipping support elements, and oriented correctly for installation.

Others have worked in the field of supplying support/transportation frames for airplane engines, and particularly, for jet engines.

U.S. Pat. No. 6,298,536 describes a supporting frame for a jet aircraft engine, useful for transport in a truck shipping mode and an airplane mode. Unfortunately, the movement needed to compact the size for air transport mode requires the use of four screw jacks, a rotation of the engine, and the addition/removal of spacers. Switching between the two modes is unduly complex and undesirable as it requires multiple crews to have an understanding of the support frame and skill needed to complete the tasks. Further, the amount of time to re-position the engine between air and truck transport modes is excessive. U.S. Pat. No. 6,170,141 similarly describes a supporting frame for shipment with the same concerns.

U.S. Pat. No. 6,292,999 describes a method of installing and removing jet aircraft engine, including the sequence of steps needed to place a jet aircraft engine on a shipping support stand. The shipping support includes a base, cradle assembly, and yoke assembly. Although it is designed to rotate the engine to reposition protruding parts for a smaller transport opening, there is no provision for moving the engine horizontally. Consequently, for transport through a narrow opening, and depending upon the engine type, it will be necessary to remove parts from an engine to allow it to fit through a 747 cargo opening.

What is needed in the marketplace is a design that simplifies the movement of the engine between shipping and air transport modes, is free of the use of multiple steps, and follows a designed movement allowing the engine and transport support to pass through a narrow opening.

BRIEF SUMMARY OF THE INVENTION

The disclosed invention comprises screw jacks and supporting rollers mounted on a base frame. A rotating cradle with rolling plates are attached to the engine. The rolling plates are set on the support rollers and the rotating cradle is rotated by the manually operated screw jacks. The curvature and position of the rolling plates are carefully chosen to provide the needed rotation and horizontal/vertical movement of the engine, so as to fit within a small transport doorway.

Additionally, important features are included that secure the cradle from rotating when transporting, secure the cradle to the support rollers for safe movement, and provides a simplified horizontal and vertical movement.

DETAILED DESCRIPTION OF THE INVENTION

To accomplish the goals already mentioned, the embodied invention is specifically designed to secure a jet aircraft engine to a transport base, and can be positioned in either a truck transport mode, and an air transport mode. The positioning between the two modes is done in a manner to confidently rotate the jet engine smoothly and with certainty of safety, ensuring that the engine makes no unsecured rotational movement between the engine and the transport base. No external equipment is required to re-position the engine between the two modes; it is entirely done with an incorporated manual geared system that requires no power.

The dual shipping mode is a need for larger jet aircraft engines, in particular, the Rolls-Royce Trent 800 aircraft engine. This engine has a significant market share and is used on larger aircraft because of its high thrust. The design of the embodied support base and associated equipment is usable for this engine, and similar sized engines. Additionally, the teachings of the disclosed invention are also useful for a variety of engines which have the need to fit through smaller openings.

A main advantage of the disclosed invention is the ability to fit a larger engine through a cargo door for a Boeing 747, or similar size opening, for air transport. This door size is commonly used in the shipping industry as a standard for the maximum allowable transport size. Engine movement by air transportation is important to the aircraft industry. The ability to stage aircraft engines at airport facilities in locations that allow for ready air transport is a specific need of aircraft maintenance. Without such planning and capability, the uptime of the aviation industry is less economic. The larger aircraft engines are worth $15-20 million dollars and last many years.

The larger aircraft engines include protruding components that increase their width and height (as measured in the installed position). It is not appealing to dismantle engine equipment to fit engines through openings that could be addressed by re-positioning the engine.

The support base includes a rugged structural assembly with plates and structural steel welded and bolted together to provide support for an engine that weighs up to 17,000 lbs. The rollers are heavy duty and are used for relatively flat, hard surfaces, such as concrete. This allows convenient storage transport by the attached tow bars, which can be moved by a fork lift. A number of lifting/securing rings are incorporated into all four sides of the base to allow the transport in a variety of transport settings. The tow bar can be attached to either end of the base.

The jet engine is secured to the rotating cradle, which comprises two rings, a front ring and a back ring. Each ring can be separated into an upper and lower piece. This provides for ready mounting the engine into the engine cradle, by bolting the lower ring pieces onto the support base, lowering the engine onto the lower ring pieces, and then bolting the upper ring pieces onto the engine. A pair of turnbuckles additionally secure the two halves of rotating cradle rings to the engine, and provide for a variety of engine sizes.

A screw jack assembly utilizes two screw jacks to rotate the rotating cradle. The jacks only provide rotation of the engine and cradle assembly through connecting points. No spacers need to be added/removed when rotating the cradle and engine.

The screw jack assembly is driven by a manual wheel, and optionally, an electric drill with an attachment that connects to the mechanical drive train. The manual mode provides important freedom when positioning the engine in a variety of settings, without the need to obtain motorized tools to relocate the engine. The use of rollers and rolling plates, in particular, provide a low force method of rotating the engine. This is an important feature of the overall design.

It should be recognized that the term 'truck transport' is not restrictive to movement by truck. It is meant to incorporate any ground and water transportation that provides the capability to ship the weight of an aircraft engine.

As already stated, it is important that the shipping support also cooperate with the methods used to install the engine. An aircraft engine is generally removed and installed utilizing 'bootstrap' equipment, which is manually operated. The disclosed transport support can be positioned under the wing of an airplane, and the engine can be directly lifted upward and installed on the airplane. This avoids the need for an intermediate step of picking up the engine from a transport support and placing it on separate mounting support. Or the need to lift the engine off the transport support with a forklift and then position it under the airplane for transportation. The disclosed support frame avoids the use of complicated overhead crane systems and other heavy lifting equipment, which is desirable in the aircraft industry.

A support frame is useful both for transport and for storage. A number of support frames may be designed to support the wide variety of engine sizes. Cost efficiency is improved when the base frame is used for a wide variety of engines, and the rotating cradle designed (or adapted) for a particular engine, or a group of engine sizes or engine types.

Figure 1:
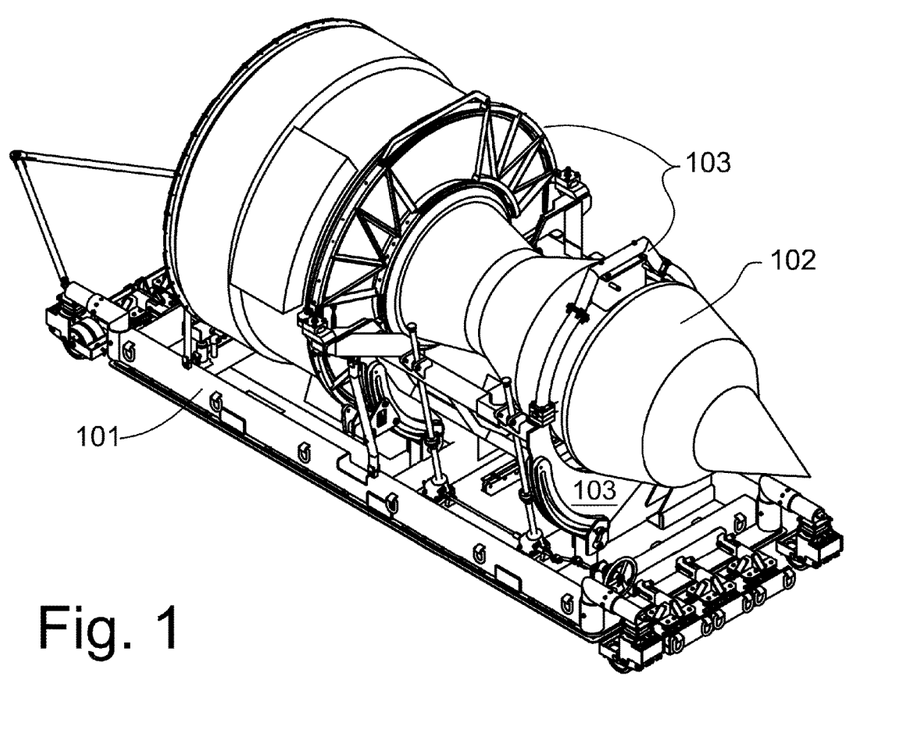
FIG. 1 shows a transport support base, an engine cradle, and an engine mounted on the transport support.

FIG. 1 shows a support base 101 that can be pulled by a tow bar, and a jet aircraft engine. The frame rests on top of heavy duty casters on each corner. A rotating engine cradle 103 is attached to both aircraft (jet) engine 102 and the support base 101. As seen, the entire support base is populated with heavy structural elements, preferably of a metal such as aluminum or steel, making the base capable of supporting and transporting weights as much as 17,000 lbs.

Figure 2A:
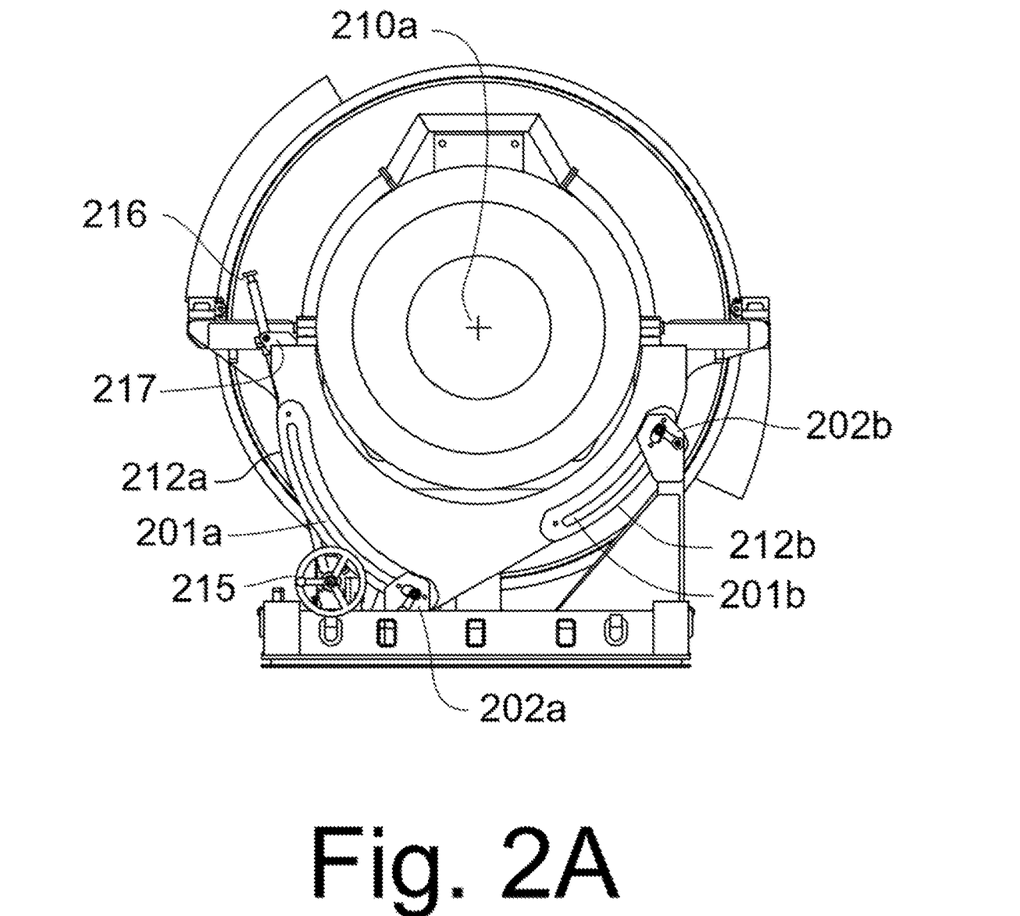
FIGS. 2A-2C show the motion of the engine center axis when rotating the engine between trucking and air shipping modes.
Figure 2B:
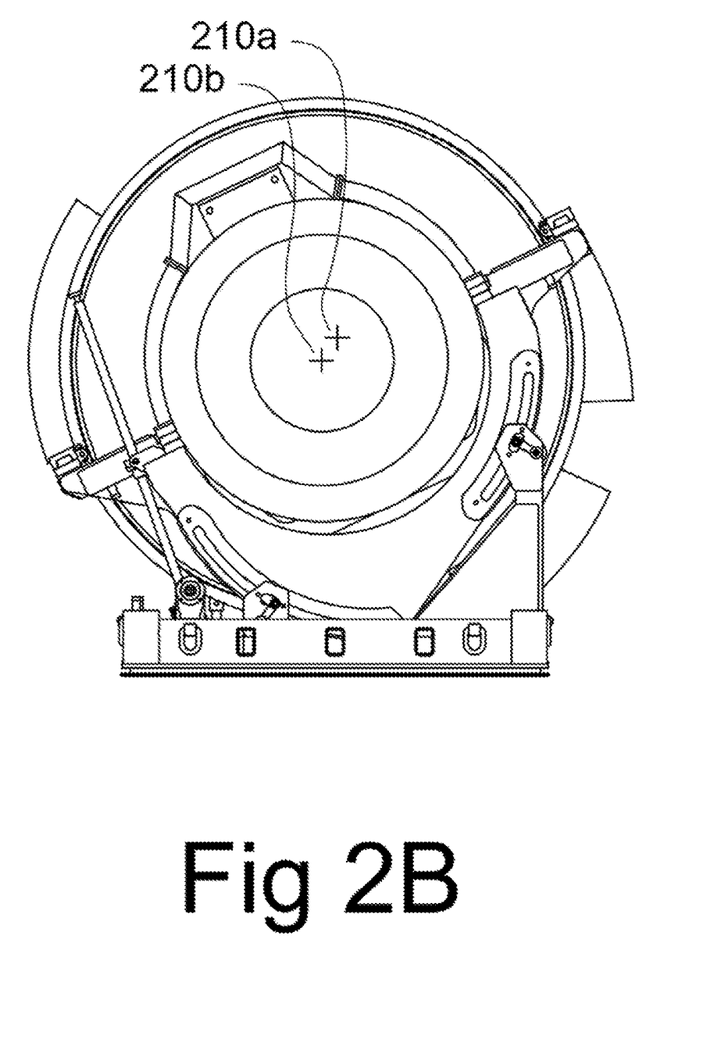
Figure 2C:
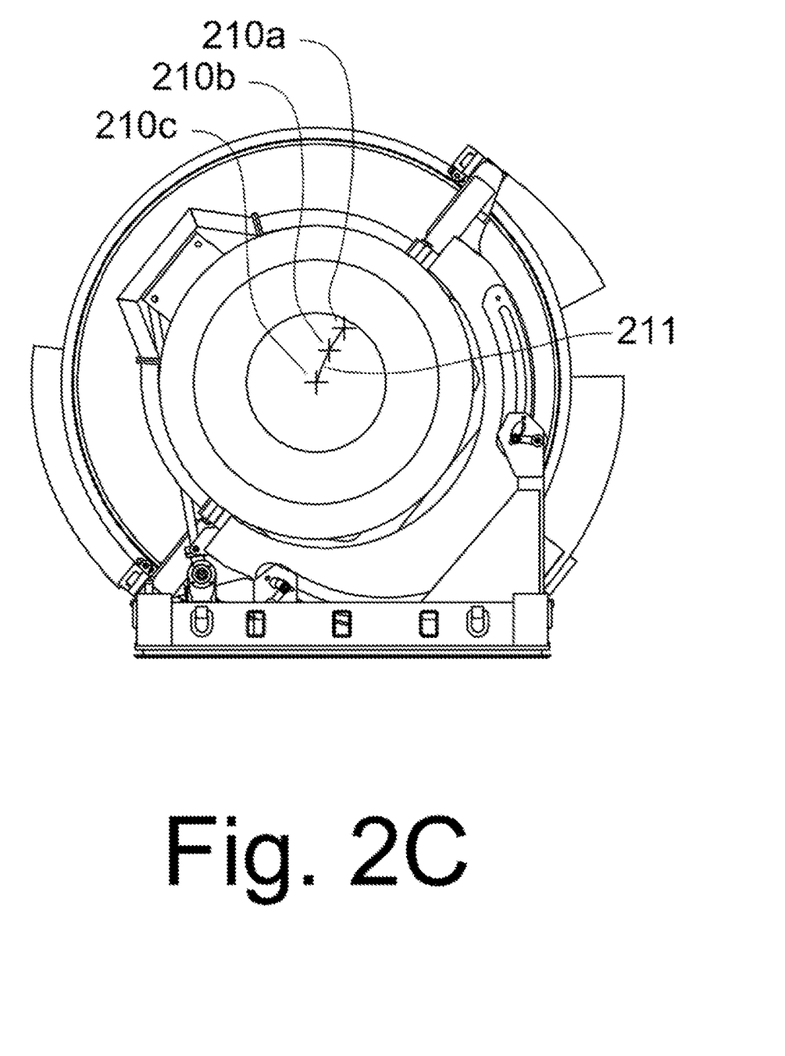

FIGS. 2A-2C show a right end view (in relation to FIG. 1) where the rotation and motion of the aircraft engine above the support base is featured. In FIG. 2A, the starting engine center mark 210a is shown in the figure, as well as important features which facilitate the rotation-motion of the aircraft engine. Roller slots 201a,b are used by the roller hold assembly 202a,b to secure the rotating cradle against the inline rollers (see FIGS. 3, 5, and 6). The curvature of two rolling plates 212a,b define the engine motion when they roll against the inline rollers that are in a fixed position relative to the base frame. Conceptually, the rolling plates define the motion, and the roller slots are used to secure the motion.

FIG. 2B show a partial rotation of the engine and the intermediate engine center mark 210b is shown. FIG. 2C show the final position of the engine center mark 210c, and the tracing of the arc motion 211 of the engine is shown. As can be seen, the engine has rotated approximately 60 degrees, and also moved downward and to the left, relative to the support base.

In FIG. 2A, a screw jack 216 is connected to an arm 217 on the engine cradle to create the needed force to rotate the engine cradle, which in turn, rotates the attached engine. A manual wheel 215 is included to turn the screw mechanism of the screw jacks. This end view only shows one screw jack. The primary force of the engine cradle rests on the rolling plates 212a,b and not on the screw jack. This is a significant improvement as it lowers the force needed to rotate the engine.

Depending upon the design of the curvature, and the height of the support rollers, the engine can be rotated and displaced in a variety of directions. For example, the curvature of the rolling plates could be reversed, so that the smaller radius of curvature is on the left rolling plates and higher than the right rolling plates.

Figures 3A, 3B, 3C:
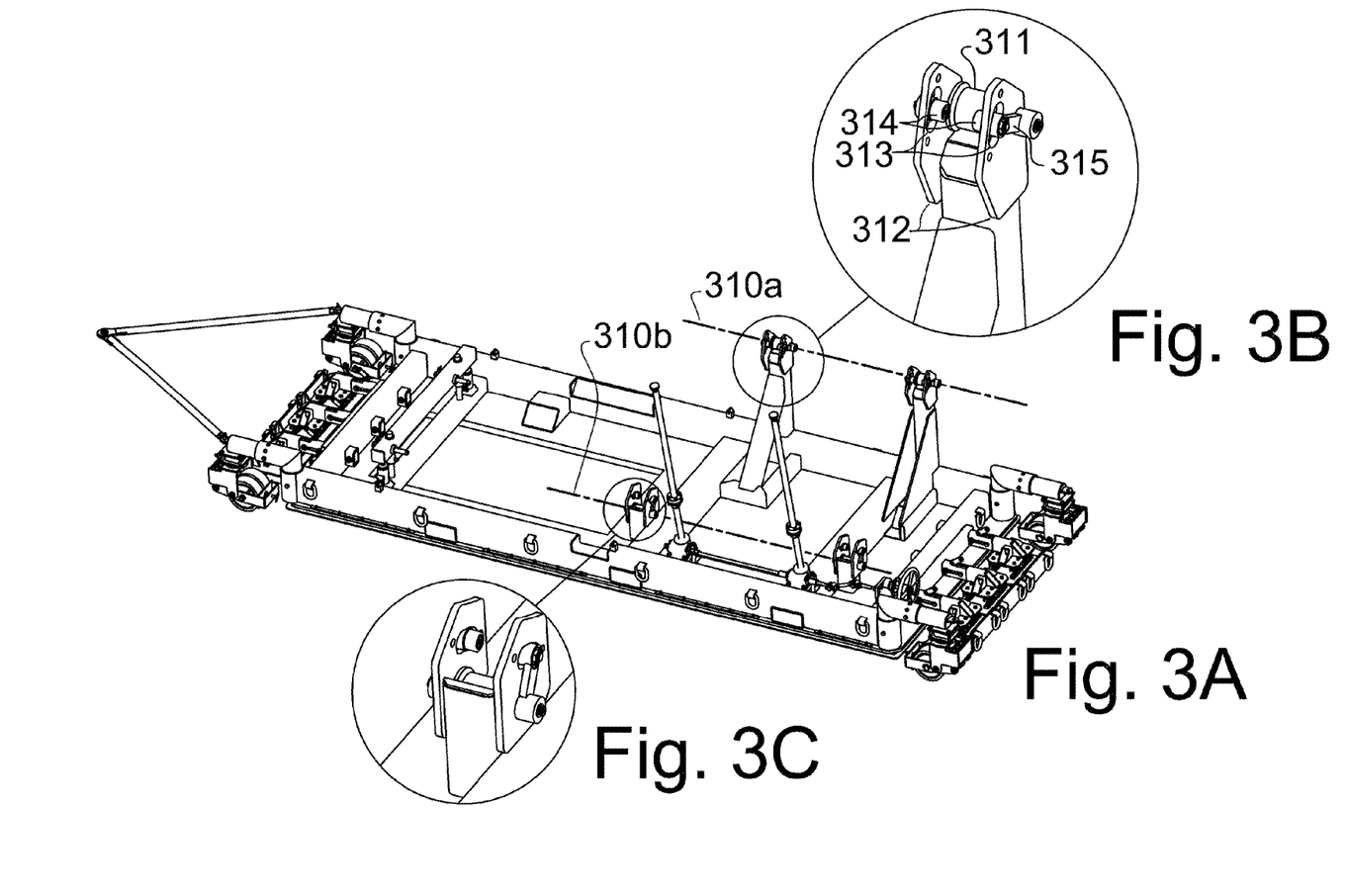
FIGS. 3A-3C show the support base and axially aligned position of the rollers which are used to rotate the engine cradle.

FIG. 3A shows important features of the base frame. Two pairs of rollers are aligned to two separate rotational axis 301a,b. The two pairs of rollers (four in total) support the four rolling plates on the engine cradle. The rollers are illustrated in larger detail in FIGS. 3B and 3C. In FIG. 3B, the supporting roller 311 is mounted between two side plates 312 with keeper slots 313 that are oversized for two keeper bearings 314. The two keeper bearings secure the rolling plates (not shown) against the roller 311, with enough clearance to allow the rolling plates to freely roll against the roller. Additionally, the keeper bearings are mounted on an arm 315 that is allowed to rotate on the same axis as the roller. To provide additional freedom of movement, the keeper bearings are allowed to move in the keeper slots 313. Two alignment axis 310a,b are shown that align each pair of rollers. As illustrated, the alignment axis 310a,b are substantially parallel to the elongated direction of the support base, and are parallel to each other. The two pairs of rolling plates are similarly aligned, so that the amount of rotation provided by the rolling plates is the same.

Although a total of four roller assemblies and four rolling plates are disclosed, this is only a preferred embodiment. An arrangement of three rolling plates and three roller assemblies could be utilized. In this case two are axially aligned and one is located on the other side of the engine center of gravity. Similarly, five rolling plates and five roller assemblies could be utilized. In this case three are axially aligned on one side, and two are axially aligned on the opposite side of the center of gravity. In a broader sense, it is conceived that only two alignment axis would be practical from a design standpoint for numbers above four. It is also conceived that any rotation of the engine would keep it substantially level throughout the movement.

Preferably, the rolling plates made from metal, and preferably a high strength metal with a surface hardness that resists damage and corrosion. As shown, the roller is machined to include a smaller diameter for the rolling plates contact area for most of its length, and larger diameter ends of much shorter length. This provides a designed groove for the rolling plates to stay within, and avoids the rolling plates from 'walking off' the roller. This is additionally assisted by the keeper bearings, which also prevent the rolling plates from 'walking off.'

Figure 4:
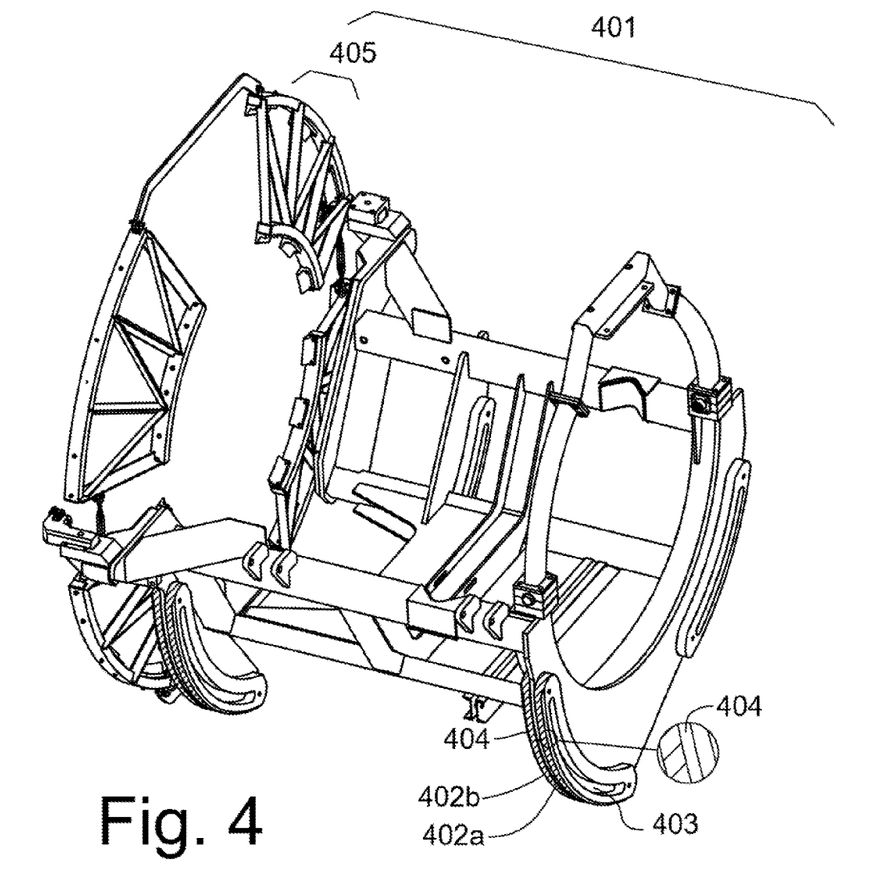
FIG. 4 shows the rotating engine cradle.

In FIG. 4, the support base and engine are not shown, only the rotating engine cradle 401 is shown for clarity of illustration. As illustrated, two curved machined plates make up a single rolling plates, and the curved machine plates are additionally attached to a center plate. The outer rolling plates surfaces 402a,b which contact the roller are highlighted by cross hatching to better understand the function of the rolling plates. The roller slot 403 is used in conjunction with the keeper bearings shown in FIG. 3 to secure the rolling plates against the roller. The slot has a curve similar to the rolling plate, but the radius is at a proportional offset amount (i.e. the slot and curved surface have the same center). The rolling plates pair are also chamfered on the edges 404, which additionally prevent the rolling plates from 'walking off' the roller, or cause unnecessary roller wear.

Also shown is the Aft Fan Case Support Ring 405. This supports the aft end of the engine fan case when the engine is rotated to the air-ship position. This is a requirement of certain engines, and is designed to keep the fan case from being deformed during shipment.

It is generally conceived that the curve of the rolling plates will be shaped in an arc, as in a circle segment, but an elliptic curve could equally be used. The curve type is not a strict requirement, and a smooth spline fit of multiple points could be used as well.

Figure 5:
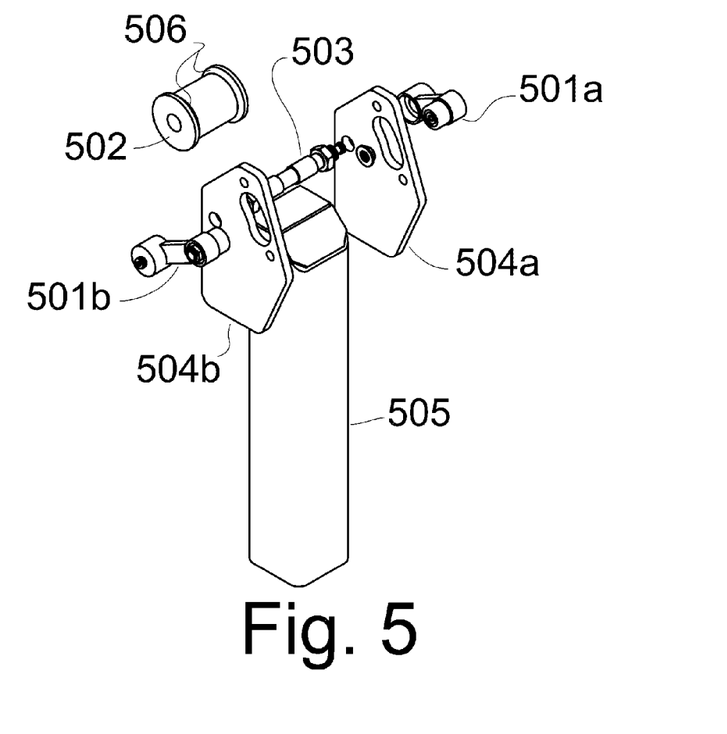
FIG. 5 shows an exploded view of the roller support details which are used to safely rotate the engine cradle.

For additional clarity, FIG. 5 shows an exploded view of the roller support assembly. The keeper bearing/arm assembly 501a,b, roller 502, roller shaft assembly 503, side plates 504a,b, and the vertical support frame 505. The roller also incorporates a chamfer 506 on the larger diameter portion of the roller. The roller is mounted on the roller shaft assembly which in turn is supported by the side plates. The keeper bearing/arm assemblies are also mounted on the roller shaft assembly.

Figures 7A, 7B:
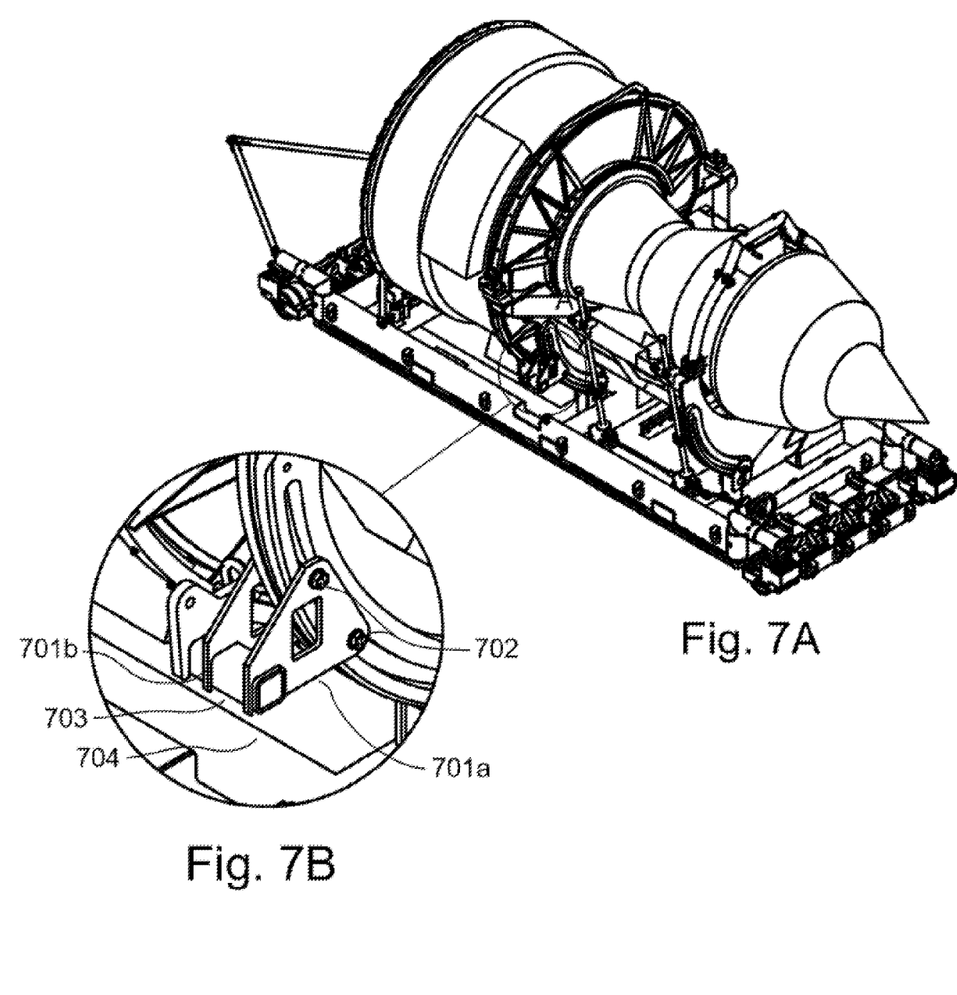
FIGS. 7A-7B show the locking feature used to secure the engine cradle from rotating during transport.

FIGS. 7A-7B show a travel locking feature used to secure the engine cradle from rotating during transport. Two side plates 701a,b with bolts 702 are mounted on a shortened structural support 703 which is attached to the base frame 704. The attachment between the structural support and base fame could be either welded or bolted, depending upon whether it is desirable to allow it to be completely removed. This travel lock—clamp assembly secures the engine cradle from rotating, and is preferably removable to allow the ring to rotate when needed.

Figures 6A, 6B:
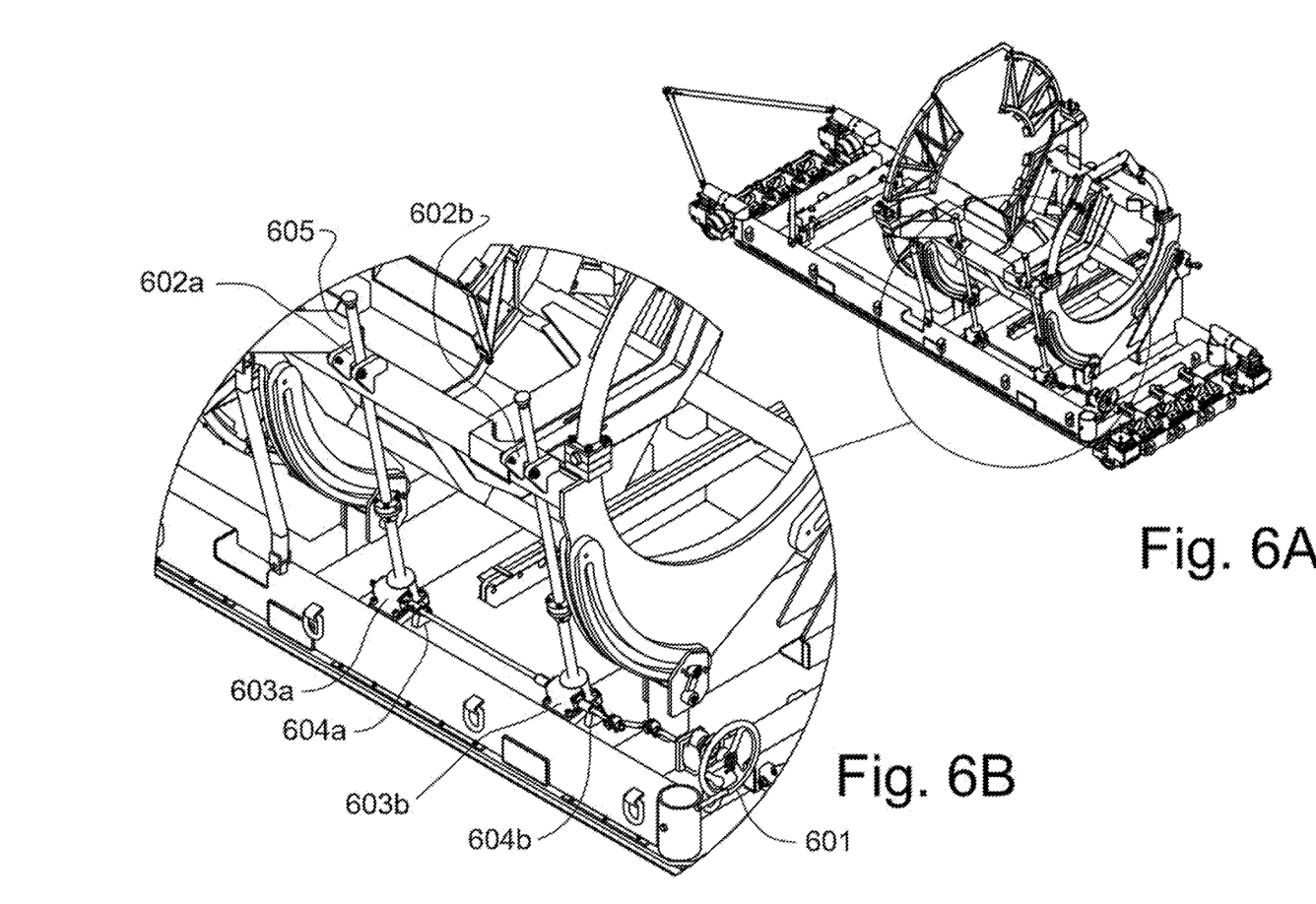
FIGS. 6A-6B show the mechanical mechanism that is used to rotate the engine cradle/

FIGS. 6A-6B show the mechanical mechanism that is used to rotate the engine cradle. A manual wheel 601 is connected to a mechanical shaft train, which in turn, is connected to a pair of screw jack bases 603a,b. The threaded shaft 605 of the screw jacks is connected to the rotating cradle at an attachment point by use of a rotatable threaded connection 602a,b. The screw jack bases are connected to a pivoting block 604a,b by a shaft which allows the screw jack assembly to pivot as needed when the engine cradle is rotated.

The rolling plates/rollers, which are part of the engine cradle rotating mechanism, bear the weight of the engine, and this avoids the need for the jackscrews to withstand the engine weight. This simplifies the rotational design, and reduces the force needed to rotate the engine. It also allows reduces the jackscrew gearing ratio to rotate the engine, which makes a single turn of the manual wheel create more engine rotation.

Figure 8:
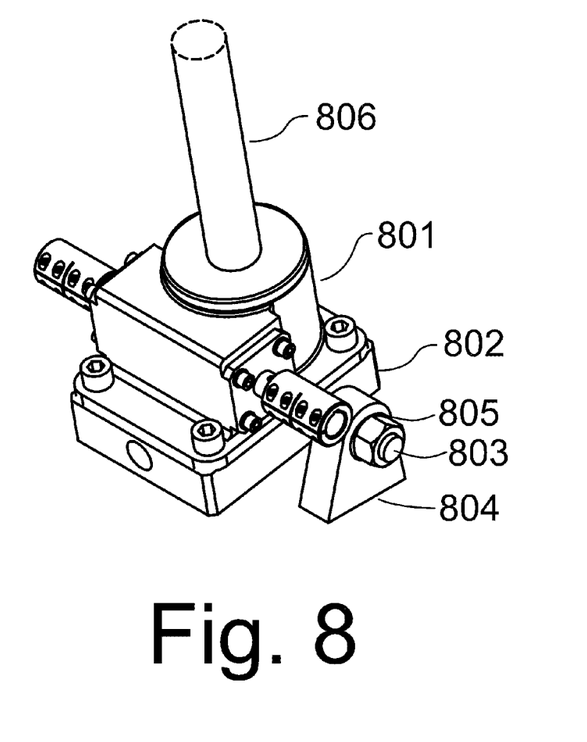
FIG. 8 shows pivoting screw jack details.

FIG. 8 shows pivoting screw jack details. A screw jack 801 is bolted onto a screw jack base 802 with a pivoting shaft 803 inserted through the base. A triangular shaped supporting block 804 supports the pivoting shaft on either side of the screw jack base and includes sleeve bearings 805 inside the supporting block to allow the pivoting shaft to rotate. The screw jack turns threaded shaft 806, which in turn, rotates the engine cradle. The pivoting block elevates the pivoting shaft high enough above the engine support base to allow the pivoting base to rotate without being bound when the screw jack rotates the engine cradle.

While various embodiments of the present invention have been described, the invention may be modified and adapted to various operational methods to those skilled in the art. Therefore, this invention is not limited to the description and

I claim:

1. A method to rotate and simultaneously displace an aircraft engine vertically and horizontally on a transport support assembly comprising:
   A) providing a transport support assembly comprising:
      1) a support base,
      2) an engine cradle designed to be connected to said aircraft engine,
      3) a plurality of rolling plates mounted on said engine cradle,
      4) wherein each of said rolling plates comprises:
         (a) a predetermined rolling surface curvature,
         (b) a predetermined rolling length,
         (c) a curved slot offset from said rolling surface curvature,
         (d) a predetermined position and orientation on said engine cradle,
      5) a plurality of support roller assemblies,
      6) wherein each of said support roller assemblies is located at a predetermined position on said support base,
      7) wherein each of said support roller assemblies is matched to a corresponding said rolling plate,
      8) wherein each of said support roller assemblies includes a roller and a pair of keeper bearings,
      9) a defined rotation of said engine cradle established by the predetermined positions of said support roller assemblies and the predetermined rolling surface curvatures, and
      10) screw shafts pivotally connected to said engine cradle,
         (a) wherein said screw shafts are connected to mechanically operated gearing, and
         (b) wherein said mechanically operated gearing is pivotably mounted on said support base,
   B) connecting said aircraft engine to said engine cradle,
   C) placing said engine cradle on said support base by use of said rolling plates and said support roller assemblies, and
   D) simultaneously rotating and displacing said aircraft engine vertically and horizontally by rotating said screw shafts.

2. The method of claim 1 wherein said engine cradle is secured onto said support base by use of said keeper bearings.

3. A transport support assembly designed to rotate and simultaneously displace an aircraft engine vertically and horizontally comprising:
   A) a support base,
   B) an engine cradle designed to be connected to said aircraft engine,
   C) a plurality of rolling plates mounted on said engine cradle,
   D) wherein each of said rolling plates comprises:
      1) a predetermined rolling surface curvature,
      2) a predetermined rolling length,
      3) a curved slot offset from said rolling surface curvature,
      4) a predetermined position and orientation on said engine cradle,
   E) a plurality of support roller assemblies,
   F) wherein each of said support roller assemblies is located at a predetermined position on said support base,
   G) wherein each of said support roller assemblies is matched to a corresponding said rolling plate,
   H) wherein each of said support roller assemblies includes a roller and a pair of keeper bearings,
   I) a defined rotation of said engine cradle is established by the predetermined positions of said support roller assemblies and the predetermined rolling surface curvatures,
   J) screw shafts pivotally connected to said engine cradle,
   K) wherein said screw shafts are connected to mechanically operated gearing, and
   L) wherein said mechanically operated gearing is pivotably mounted on said support base.

4. The assembly according to claim 3 wherein:
   A) a first pair of said support roller assemblies align up a first axis,
   B) a second pair of said support roller assemblies align to a second axis, and
   C) wherein said first axis and said second axis are substantially level and aligned to the elongated direction of said support base.

5. The assembly according to claim 4 wherein:
   A) a matching pair of said rolling plates align to said first pair of said support roller assemblies, and
   B) a matching pair of said rolling plates align to said second pair of said support roller assemblies.

6. The assembly according to claim 3 wherein each said roller assembly comprises:
   A) two side plates, each side plate incorporating a curved keeper slot,
   B) a roller with chamfered edges,
   C) a keeper arm connected to each side plate,
   D) a keeper roller connected to each keeper arm,
   E) wherein said keeper roller is positioned in said curved keeper slot, and
   F) wherein a corresponding said rolling plate is located between said keeper roller and said roller.

7. The assembly according to claim 3 wherein:
   A) said mechanically operated gearing is mounted on a base plate,
   B) said base plate incorporates a through hole,
   C) a base plate shaft located in said through hole,
   D) wherein said base plate shaft is positioned horizontally,
   E) a pivot support block incorporating a sleeve bearing attached to each end of said base plate shaft, and
   F) wherein each said pivot support block is rigidly attached to said support base.

8. The assembly according to claim 3 wherein said engine cradle comprises two cradle frames, wherein each of said cradle frames further comprise an upper frame and a lower frame.

9. The assembly according to claim 3 further comprising a cradle lock assembly comprising:
   A) two side plates with a plurality of perpendicular bolts,
   B) wherein said side plates are mounted on a structural support,
   C) wherein said structural support is bolted to said support base, and
   D) wherein said plurality of bolts fit into a predetermined said curved slot.

10. The assembly according to claim 3 wherein each said rolling plate comprises:
    A) a pair of machined plates rigidly attached to either side of a support plate, B) wherein said machined plates incorporates a chamfer on the outer surface of said curved plates and adjacent to said rolling surface curvature.

\* \* \* \* \*